United States Patent
Aizawa et al.

(10) Patent No.: US 10,093,255 B2
(45) Date of Patent: Oct. 9, 2018

(54) VEHICLE BUMPER

(71) Applicant: Honda Motor Co.,Ltd., Tokyo (JP)

(72) Inventors: Teruaki Aizawa, Saitama (JP); Tatsuya Ishizaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 15/458,948

(22) Filed: Mar. 14, 2017

(65) Prior Publication Data

US 2017/0274850 A1 Sep. 28, 2017

(30) Foreign Application Priority Data

Mar. 28, 2016 (JP) ................................. 2016-063146

(51) Int. Cl.
*B60R 19/18* (2006.01)
*B60R 19/14* (2006.01)
*B60R 19/48* (2006.01)

(52) U.S. Cl.
CPC .............. *B60R 19/18* (2013.01); *B60R 19/14* (2013.01); *B60R 19/48* (2013.01); *B60R 19/483* (2013.01); *B60R 2019/186* (2013.01)

(58) Field of Classification Search
CPC ....... B60R 19/02; B60R 19/023; B60R 19/14; B60R 19/18; B60R 19/483
USPC .................................................. 293/120, 122
See application file for complete search history.

(56) References Cited

U.S. PATENT DOCUMENTS

| 3,473,836 A * | 10/1969 | Halter ..................... B60R 19/18 114/219 |
| 2016/0101753 A1* | 4/2016 | Higashimachi ....... B60R 19/023 293/117 |

FOREIGN PATENT DOCUMENTS

| JP | 2010260516 | 11/2010 | |
| JP | 2015-178316 | 10/2015 | |
| WO | WO-2014108723 A1 * | 7/2014 | ............. B60R 19/18 |

OTHER PUBLICATIONS

"Office Action of Japan Counterpart Application," with machine English translation thereof, dated Sep. 19, 2017, p. 1-p. 8, in which the listed reference was cited.

* cited by examiner

*Primary Examiner* — Jason S Daniels
(74) *Attorney, Agent, or Firm* — JCIPRNET

(57) ABSTRACT

A vehicle bumper includes: a bumper beam, a bumper face, covering a vehicle body front surface of the bumper beam, and a buffer component, provided between the bumper beam and the bumper face. The buffer component includes a platelike component configured to be folded upon collision load. The buffer component includes a folded part, and two surface parts that are connected through the folded part and are opposite to each other with a gap therebetween in a front-rear direction of the vehicle. A pressure pipe configured to be deformed by being clamped between the two surface parts so as to detect impact is provided in the gap. A lower space part that avoids interference between the bumper beam and a setting part for the pressure pipe in the buffer component is provided below the bumper beam.

7 Claims, 7 Drawing Sheets

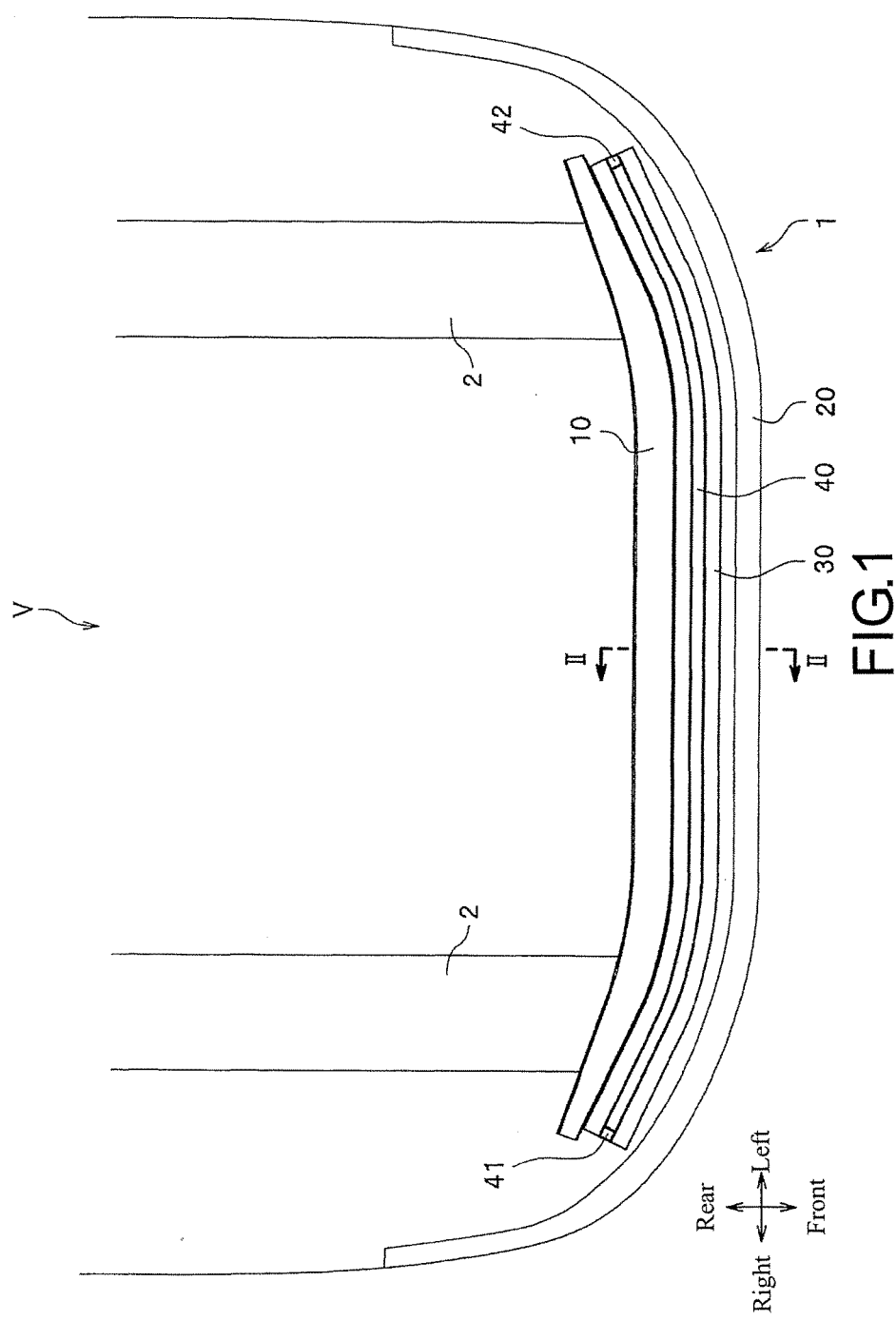

VEHICLE BUMPER

CROSS-REFERENCE TO RELATED APPLICATION

This application claims the priority benefit of Japan application serial no. 2016-063146, filed on Mar. 28, 2016. The entirety of the above-mentioned patent application is hereby incorporated by reference herein and made a part of this specification.

BACKGROUND OF THE INVENTION

1. Field of the Invention

The present invention relates to a vehicle bumper.

2. Description of Related Art

An existing vehicle bumper that has both an impact absorbing function of mitigating impact of a collided object (for example, a structure of a pedestrian), and a collision detection function of detecting collision between the vehicle bumper and the collided object is known.

For example, patent document 1 discloses the following vehicle bumper: in the vehicle bumper, a buffer component that can be folded upon collision load is provided between a bumper beam mounted in the front of a vehicle body and a bumper face that is exposed outside and provided on a headmost part of the vehicle, and a pressure pipe is provided on an inner side of the buffer component.

The buffer component, for example, is manufactured by performing stamping forming on sheet steel with relatively low rigidity into an approximate V shape, and includes a folded part and two surface parts that are connected by means of the folded part. The pressure pipe is a flexible component configured between the two surface parts, and a pressure sensor configured to detect internal pressure is connected to an end part of the pressure pipe.

According to the prior art, when the vehicle collides with a collided object, the buffer component is folded in a manner of making the two surface parts approach to each other by using the folded part as a base point, so as to mitigate impact on the collided object. In addition, with deformation of the buffer component, the pressure pipe is deformed because the pressure pipe is clamped between the surface parts, pressure in the pressure pipe changes, and the pressure change is detected by using the pressure detector to output a collision signal.

PRIOR ART DOCUMENT

Patent Document

[Patent document 1]: JP Patent Publication No. 2015-178316

SUMMARY OF THE INVENTION

Problem to be Resolved by the Present Invention

In the prior art, a buffer component that holds a pressure pipe is configured between a bumper beam with high rigidity and a collided object, and therefore, if the buffer component generates deformation that reaches the bumper beam, sometimes, the pressure pipe is powerfully clamped between the bumper beam and the collided object. As a consequence, excessive deformation of the pressure pipe may be caused and pressure changes cannot be detected or it is difficult to detect pressure changes.

The present invention is an invention formed in view of the content, and is directed to provide a vehicle bumper that can avoid interference between the pressure pipe and the bumper beam to inhibit excessive deformation of the pressure pipe.

Technical Means for Resolving the Problem

To resolve the problem, the present invention is a vehicle bumper configured to mitigate impact on a collided object when collision between the vehicle bumper and the collided object occurs, and includes: a bumper beam, which extends along a vehicle width direction; a bumper face, which covers a vehicle body front surface or a vehicle body rear surface that includes the bumper beam; and a buffer component, which is provided between the bumper beam and the bumper face. The bumper beam includes a front surface part that becomes a collision surface, and at least one of an upper surface part connected to an upper end part of the front surface part and a lower surface part connected to a lower end part of the front surface part. The buffer component includes a platelike component that can be folded upon collision load. The buffer component includes at least one folded part, and at least two surface parts that are connected through the folded part and are opposite to each other with a gap therebetween in a front-rear direction of the vehicle. A pressure pipe configured to be deformed by being clamped between the two surface parts so as to detect impact is provided in the gap. A space part configured to avoids interference between the bumper beam and a setting part for the pressure pipe in the buffer component during collision is provided.

According to the present invention, the space part that avoids interference between the bumper beam and the setting part of the pressure pipe in the buffer component during collision is provided, and therefore if the buffer component generates deformation that reaches the bumper beam, the pressure pipe enters the space part. Therefore, interference between the pressure pipe and the bumper beam can be avoided, to inhibit excessive deformation of the pressure pipe. Therefore, pressure changes can be suitably detected by using a pressure sensor.

In addition, preferably, an upper space part located at an upper location relative to the upper surface part or a lower space part located at a lower location relative to the lower surface part forms the space part. The pressure pipe is configured in an offset manner in a height direction relative to the front surface part of the bumper beam.

In this case, if the buffer component generates deformation that reaches the bumper beam, the setting part of the pressure pipe in the buffer component is deformed in a manner of being staggered with the upper surface part or the lower surface part, and enters the upper space part located at an upper location relative to the upper surface part or the lower space part located at a lower location relative to the lower surface part. Therefore, interference between the pressure pipe and the bumper beam can be avoided, to inhibit excessive deformation of the pressure pipe. Therefore, pressure changes can be suitably detected by using a pressure sensor.

In addition, preferably, a cut part formed by cutting a part of a front surface part towards a rear side of a collision direction is provided in the bumper beam. The cut part forms the space part, and the pressure pipe is disposed at a height location the same as that of the cut part.

In this case, if the buffer component generates deformation that reaches the bumper beam, the setting part of the pressure pipe in the buffer component is deformed in a manner of entering the cut part, and the pressure pipe enters the cut part. Therefore, interference between the pressure pipe and the bumper beam can be avoided, to inhibit excessive deformation of the pressure pipe. Therefore, pressure changes can be suitably detected by using the pressure sensor. In addition, if the cut part is used as an interference avoiding unit, even in a case in which there is no space for layout on upper and lower sides of the bumper beam, interference between the pressure pipe and the bumper beam can also be avoided.

In addition, preferably, a recess formed by recessing a part of the front surface part towards the rear side of the collision direction is provided in the bumper beam. The recess forms the space part, and the pressure pipe is disposed at a height location the same as that of the recess.

In this case, if the buffer component generates deformation that reaches the bumper beam, the setting part of the pressure pipe in the buffer component is deformed in a manner of entering the recess, and the pressure pipe enters the recess. Therefore, interference between the pressure pipe and the bumper beam can be avoided, to inhibit excessive deformation of the pressure pipe. Therefore, pressure changes can be suitably detected by using the pressure sensor. In addition, rigidity of a cross section of the bumper beam is improved due to the recess, and therefore the impact absorbing performance can be improved.

In addition, preferably, a bent part that becomes a base point upon which the buffer component is bent is formed on an end part, located on a side opposite to the folded part, of the surface part located in a rear part of the vehicle. A distance from the bent part to a peripheral surface on a side of the bent part of the pressure pipe is set to be greater than a distance from the bent part to an end part on a side of the space part of the front surface part.

In this case, in state before collision, even in a case in which the pressure pipe is located at an upper location or a lower location relative to the space part, the pressure pipe enters the space part during collision.

Effect of the Present Invention

According to the vehicle bumper of the present invention, interference between the pressure pipe and the bumper beam can be avoided, to inhibit excessive deformation of the pressure pipe.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic plan view of a vehicle that includes a vehicle bumper of an implementation manner of the present invention.

DESCRIPTION OF THE EMBODIMENTS

Figure 2A:
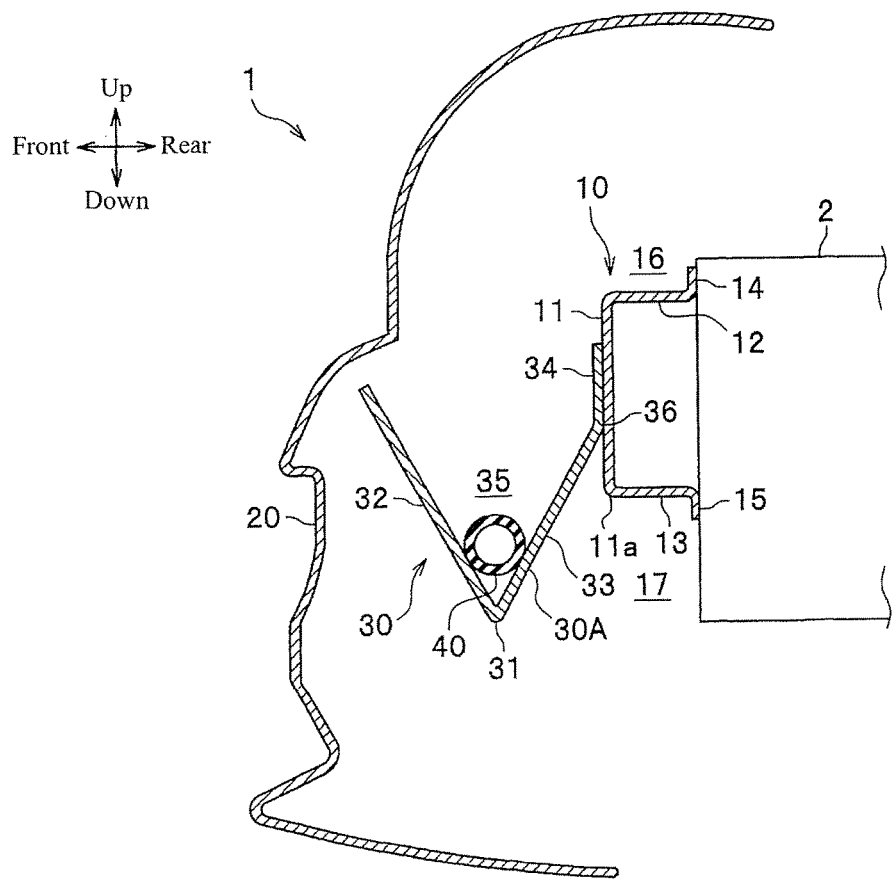
FIG. 2A is cross-sectional view along a II-II line of FIG. 1.

Reference will now be made in detail to the present preferred embodiments of the invention, examples of which are illustrated in the accompanying drawings. Wherever possible, the same reference numbers are used in the drawings and the description to refer to the same or like parts.

Implementation manners of the present invention are described in detail by means of suitable reference to the accompanying drawings. Same symbols are attached to same structural elements and repeated descriptions are omitted. Further, when directions are described, description is provided based on front, rear, left, right, up, and down seen by a driver. In addition, the meaning of "vehicle width direction" is the same as the meaning of "left-right direction". In the present implementation manner, cases in which a vehicle bumper of the present bumper is applied to a front bumper are exemplified, but uses of the vehicle bumper are not limited.

As shown in FIG. 1, a vehicle V includes: a pair of left and right front side frames 2, 2, which are provided on left and right sides of a front part of the vehicle V and extend along a front-rear direction of the vehicle; and a vehicle bumper 1, which is provided on the front part of the vehicle V and extends along a vehicle width direction.

The vehicle bumper 1 has the following functions, that is, mitigating impact on a collided object when collision between the vehicle V and the collided object, for example, a structure or a pedestrian occurs, and detecting collision between the vehicle V and the collided object.

The vehicle bumper 1 includes: a bumper beam 10, which extends along the vehicle width direction; a bumper face 20, which covers a vehicle body front surface that includes the bumper beam 10; a buffer component 30, which is provided between the bumper beam 10 and the bumper face 20 and extends along the vehicle width direction; and a pressure pipe 40, which is provided on an inner side of the buffer component 30.

The bumper beam 10 is a component provided in an extending way in a manner of crossing the left and right front side frames 2, 2. The bumper beam 10, for example, includes a metal material. The bumper beam 10 shown in FIG. 2A includes a front surface part 11, an upper surface part 12, a lower surface part 13, an upper flange part 14, and a lower flange part 15, and is in a shape of a top hat during longitudinal profile observation. A cross-sectional shape of the bumper beam 10 needs to include only the front surface part 11 and at least one of the upper surface part 12 and the lower surface part 13, and is not particularly limited, for example, may also be set as a hollow shape.

The front surface part 11 is a straight-line-shaped part that extends along a vertical direction. As stated below, the front surface part 11 becomes a collision surface collided by a deformed buffer component 30 when collision between the vehicle V and the collided object occurs.

The upper surface part 12 is a straight-line-shaped part that extends along a front-rear direction. The upper surface part 12 is connected to an upper end part of the front surface part 11 and extends backwards from the upper end part.

The lower surface part 13 is a straight-line-shaped part that extends along a front-rear direction. The lower surface part 13 is connected to a lower end part of the front surface part 11 and extends backwards from the lower end part.

The upper flange part 14 is a straight-line-shaped part that extends along a vertical direction. The upper flange part 14 is connected to a rear end part of the upper surface part 12 and extends upwards from the rear end part. The upper flange part 14 is connected to a front part end of the front side frame 2. An upper space part 16 that is open towards the front and above of the vehicle is provided above the upper surface part 12 and in front of the front side frame 2. The upper space part 16 is provided at a further rear location of the vehicle relative to the front surface part 11.

The lower flange part 15 is a straight-line-shaped part that extends along a vertical direction. The lower flange part 15 is connected to a rear end part of the lower surface part 13 and extends downwards from the rear end part. The lower flange part 15 is connected to a front part end of the front side frame 2. A lower space part 17 that is open towards the front and below of the vehicle is provided below the lower surface part 13 and in front of the front side frame 2. The lower space part 17 is provided at a further rear location of the vehicle relative to the front surface part 11. During collision, the lower space part 17 functions as a space part that avoids interference between the bumper beam 10 and a setting part 30A for the pressure pipe 40 in the buffer component 30. This aspect will be described in detail below.

The bumper face 20 is a component that is exposed outside and located on a headmost part of the vehicle V. The bumper face 20 includes a resin material, a metal material, or the like that can be deformed when collision between the vehicle V and the collided object occurs.

The buffer component 30 absorbs collision energy (collision load) by means of deformation when collision between the vehicle V and the collided object occurs, to mitigate impact load on the vehicle V or passengers in the vehicle V. The buffer component 30 shown in FIG. 2A includes a folded part 31, two surface parts 32, 33, and a buffer flange part 34, and is approximately V-shaped during longitudinal profile observation. A cross-sectional shape of the bumper component 30 needs to include only one folded part 31 and two surface parts 32, 33, and is not particularly limited, for example, may also be set as a U shape, an M shape, or a W shape.

The buffer component 30 includes a platelike component that can be folded upon collision load, and is manufactured by means of, for example, stamping forming on sheet steel. The buffer component 30 is folded in a manner of making the two surface parts 32, 33 approach to each other by using the folded part 31 as a base point, and is bent backwards by using a boundary part between the rear surface part 33 and the buffer flange part 34 as a base point.

The folded part 31 is a lowest part in the buffer component 30. The folded part 31 is bent in a shape of an acute angle in a manner of protruding downwards.

The two surface parts 32, 33 are two parts that are connected by means of the folded part 31 and are opposite to each other with a gap 35 therebetween in a front-rear direction of the vehicle. The two surface parts 32, 33 are inclined in a manner of gradually departing from each other from the folded part 31 upwards. A bent part 36 that becomes the base point upon which the buffer component 30 is bent backwards is formed on an upper end part of the surface part 33.

The buffer flange part 34 is a straight-line-shaped part connected to the front surface part 11 of the bumper beam 10. The buffer flange part 34 extends upwards from the upper end part of the rear surface part 33.

The pressure pipe 40 is provided in the gap 35 of the buffer component 30. The pressure pipe 40 is a flexible part that can be deformed because the pressure pipe 40 is clamped between the two surface parts 32, 33, so as to detect impact when collision between the vehicle V and the collided object occurs. The pressure pipe 40 respectively abuts against the two surface parts 32, 33 in state before collision. The pressure pipe 40 is provided at a lower location, near the folded part 31, in the gap 35. The pressure pipe 40 includes an elongated cylindrical body. One end part in a long edge direction of the pressure pipe 40 is blocked by a cover body 41 (referring to FIG. 1). The other end part in the long edge direction of the pressure pipe 40 is blocked by a pressure sensor 42 (referring to FIG. 1) that detects pressure in the pressure pipe 40.

In the implementation manner, after the pressure pipe 40 is deformed upon collision load, pressure in the pressure pipe 40 changes. The pressure change is detected by the pressure sensor 42, and collision signal is output to a control apparatus not shown in the figure. The control apparatus controls work of a safety apparatus, for example, a safety airbag for a pedestrian based on the collision signal.

Figure 2B:
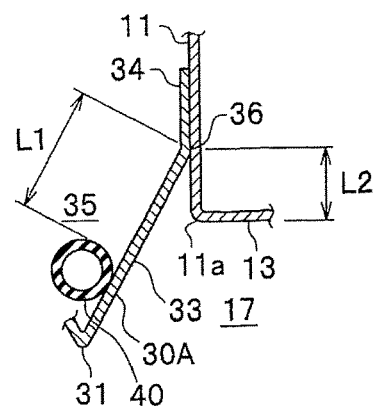
FIG. 2B is a local enlarged cross-sectional view of FIG. 2A.

In state before collision, the pressure pipe 40 is configured in an offset manner below a height direction relative to the front surface part 11 of the bumper beam 10. The pressure pipe 40 in the implementation manner is configured at a lower location relative to the lower surface part 13 of the bumper beam 10. As shown in FIG. 2B, a distance L1 from the bent part 36 formed on the upper end part of the surface part 33 to an upper peripheral surface of the pressure pipe 40 is set to be greater than a distance L2 from the bent part 36 to a lower end part 11a of the front surface part 11 (L1>L2). Therefore, as stated below, the setting part 30A of the pressure pipe 40 in the buffer component 30 can enter the lower space part 17 during collision.

Figure 3:
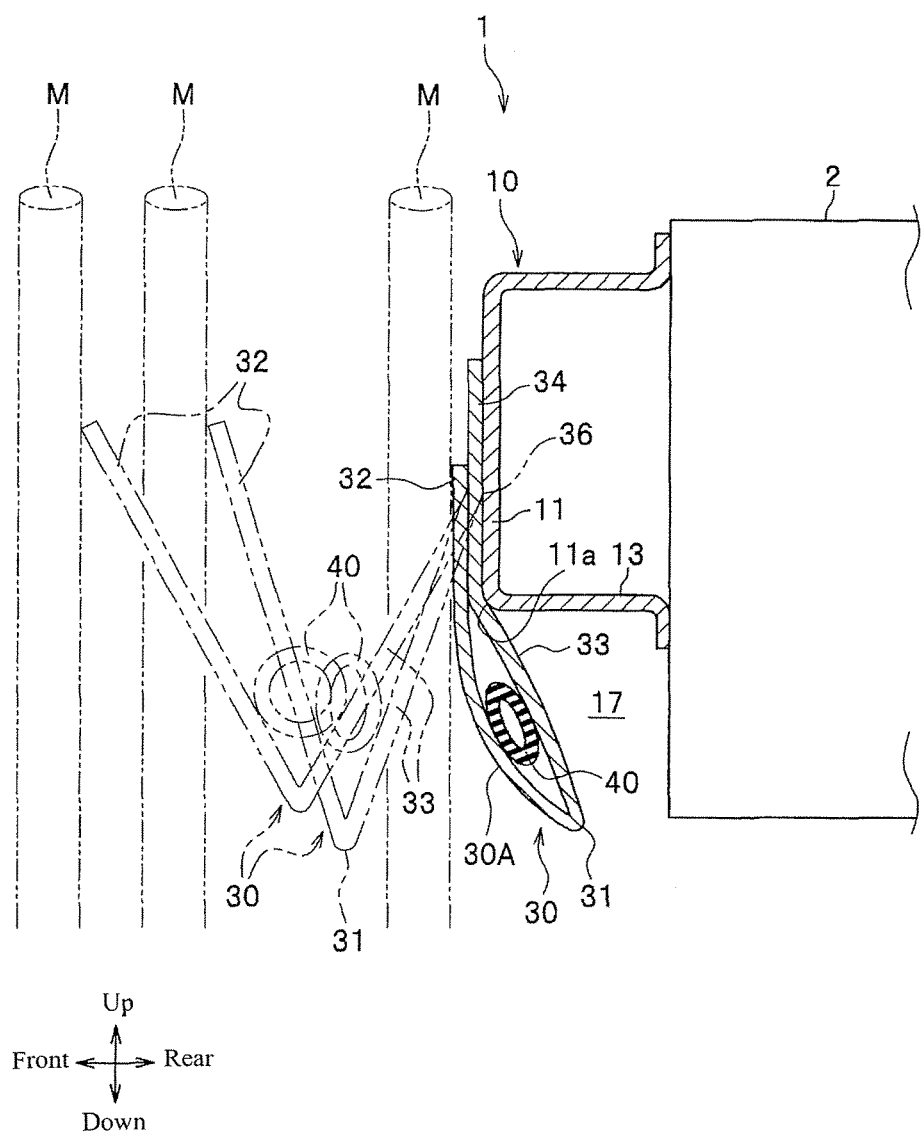
FIG. 3 is a cross-sectional view of a collision process of a vehicle bumper of the implementation manner.

The vehicle bumper 1 of the present implementation manner basically uses the foregoing structure. Secondly, action effects of the vehicle bumper 1 are described referring to FIG. 3.

After a collided object M collides with the bumper face 20 (not drawn in FIG. 3), if the bumper face 20 is deformed, the collided object M collides with the surface part 32 located in the front of the buffer component 30 via the bumper face 20 and the pushes the buffer component 30 backwards.

Collision load (collision energy) of the collided object M is input into the buffer component 30, and therefore the buffer component 30 is deformed. The buffer component 30 is folded in a manner of making the two surface parts 32, 33 approach to each other by using the folded part 31 as a base point, and is bent backwards by the bent part 36 as a base point.

Because the buffer component 30 is folded, the pressure pipe 40 is clamped between the two surface parts 32, 33, and is squished from a cylindrical cross-sectional surface into a lengthwise elliptical cross-sectional surface and is deformed.

If the buffer component 30 is further deformed, the rear surface part 33 collides with the front surface part 11 of the bumper beam 10. In the present implementation manner, because the pressure pipe 40 is configured in an offset manner below a height direction relative to the front surface part 11 of the bumper beam 10, a lower part, which includes the setting part 30A of the pressure pipe 40, in the buffer component 30 abuts against the lower end part 11a of the front surface part 11, and is further bent backwards by using the lower end part 11a as a base point. In this case, the setting part 30A of the pressure pipe 40 is deformed in a manner of being staggered with the lower surface part 13 and enters the lower space part 17

According to the present implementation manner described above, if the buffer component 30 generates deformation that reaches the bumper beam 10, the setting part 30A of the pressure pipe 40 in the buffer component 30 enters the lower space part 17, and therefore, interference between the pressure pipe 40 and the bumper beam 10 can be avoided to inhibit excessive deformation of the pressure pipe 40. Therefore, pressure changes can be suitably detected by using the pressure sensor 42.

In addition, in a collision detection system in which the pressure sensor 42 is provided on an end part of the pressure pipe 40, the pressure sensor 42 functions as a passive element of pressure, and therefore it is difficult to detect a fault (for example, failure) of the pressure pipe 40 caused by interference with the bumper beam 10.

With respect to the foregoing problem, according to the present implementation manner, the setting part 30A of the pressure pipe 40 in the buffer component 30 enters the lower space part 17 to avoid inference between the pressure pipe 40 and the bumper beam 10, and therefore reliability of collision detection performance of the pressure pipe 40 can be ensured without changing the collision detection system.

The foregoing describes the vehicle bumper 1 of the present implementation manner in detail with reference to the accompanying drawings. However, the present invention is not limited thereto, and suitable changes can be made without departing from the spirit of the present invention.

For example, the following structure is used in the implementation manner, that is, the pressure pipe 40 is configured in an offset manner below the height direction relative to the front surface part 11 of the bumper beam 10. However, the present invention is not limited thereto. The following structure may also be used, that is, the pressure pipe 40 is configured in an offset manner above the height direction relative to the front surface part 11 of the bumper beam 10; the setting part 30A of the pressure pipe 40 in the buffer component 30 enters the upper space part 16. In this case, upper and lower locations, relative to the front side frames 2, of the bumper beam 10 are staggered, and the buffer component 30 is configured upside down.

Secondly, a vehicle bumper 1 of a first modified example is described with reference to FIG. 4A, FIG. 4B, and FIG. 5. Further, same symbols are attached to elements the same as those in the implementation manner and repeated descriptions are omitted.

Figure 4A:
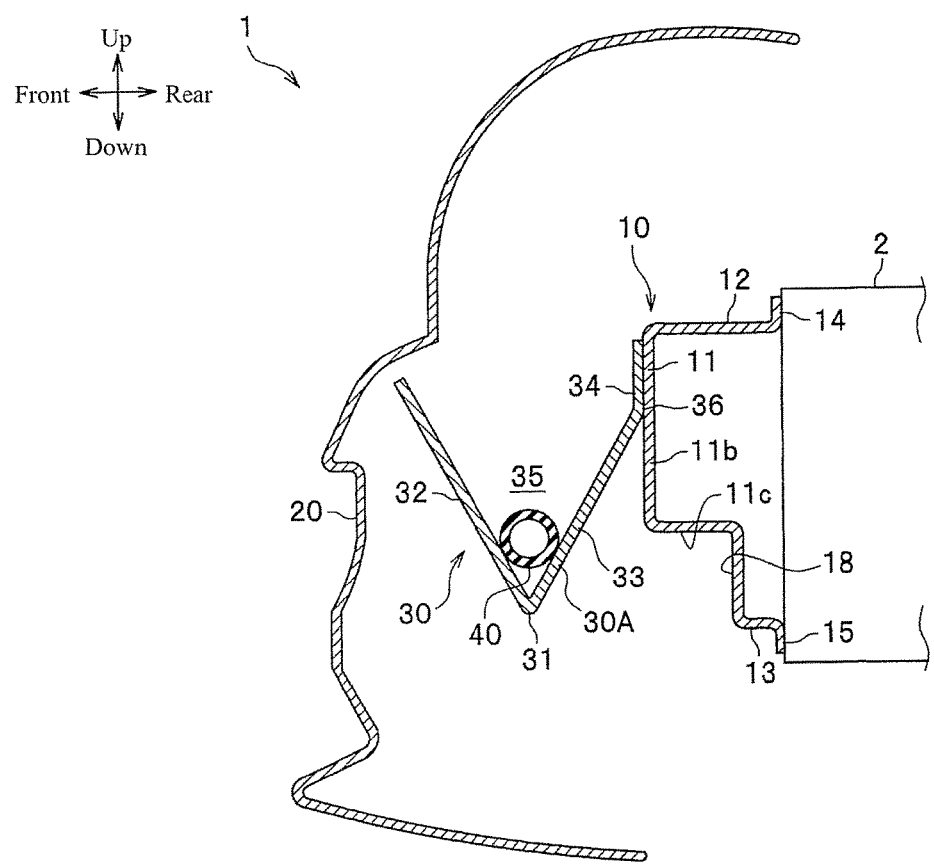
FIG. 4A is a cross-sectional view, which corresponds to FIG. 2A, of a vehicle bumper of a first modified example of the present invention.
Figure 4B:
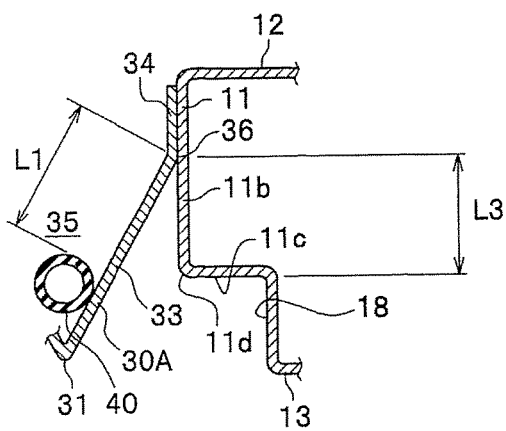
FIG. 4B is a local enlarged cross-sectional view of FIG. 4A.

As shown in FIG. 4A, a cut part 18 formed by cutting a part of a front surface part 11 towards a rear side of a collision direction (a rear part of a vehicle in the present modified example) is provided in a bumper beam 10 of the first modified example. The cut part 18 is formed by cutting a specified range that includes a lower end part of the front surface part 11, and is provided on the front surface part 11 in a manner of extending along a vehicle width direction.

During collision, the cut part 18 functions as a space part that avoids interference between the bumper beam 10 and a setting part 30A for a pressure pipe 40 in a buffer component 30. The front surface part 11 of the modified example includes an abutting surface 11b located on an upper side and a step surface 11c that is located on a lower side and has an L-shaped cross section. The step surface 11c (the cut part 18) is provided at a further rear location of the vehicle relative to the abutting surface 11b.

The pressure pipe 40 is disposed at a height location approximately the same as that of the cut part 18 in state before collision. In detail, an upper side of the pressure pipe 40 is configured at an upper location relative to the cut part 18, and is located at a location overlapping with the abutting surface 11b in a front-rear direction of the vehicle. As shown in FIG. 4B, a distance L1 from a bent part 36 formed on an upper end part of a surface part 33 to an upper peripheral surface of the pressure pipe 40 is set to be greater than a distance L3 from the bent part 36 to a lower end part 11d of the abutting surface 11b (L1>L3). Therefore, as stated below, the setting part 30A of the pressure pipe 40 in the buffer component 30 can enter the cut part 18 during collision. In other words, along as along the distance condition is satisfied, in state before collision, even in a case in which the pressure pipe 40 is located at an upper location relative to the cut part 18, the pressure pipe 40 enters the cut part 18 during collision.

Figure 5:
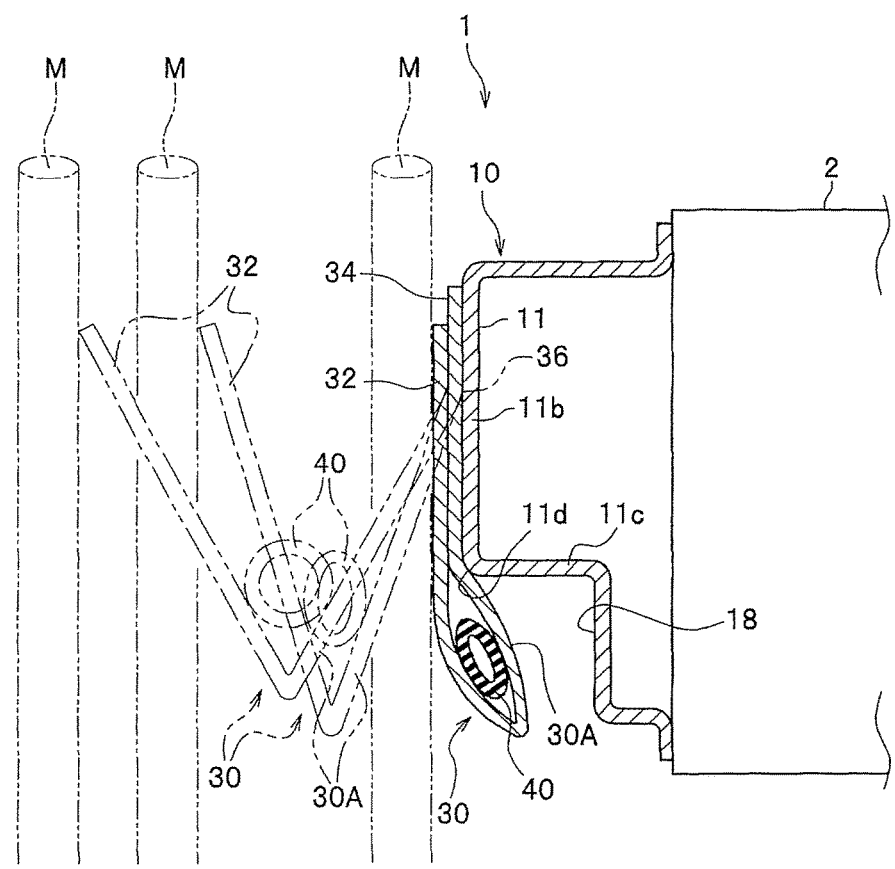
FIG. 5 is a cross-sectional view of a collision process of a vehicle bumper of the first modified example.

In a collision process of the vehicle bumper 1 shown in FIG. 5, according to the present modified example, because the pressure pipe 40 is disposed at a height location approximately the same as that of the cut part 18, a lower part, which includes the setting part 30A of the pressure pipe 40, in the buffer component 30 abuts against the lower end part 11d of the abutting surface 11b, and is bent backwards by using the lower end part 11d as a base point. In this case, the setting part 30A of the pressure pipe 40 in the buffer component 30 is deformed in a manner of entering the cut part 18, and the pressure pipe 40 enters the cut part 18.

According to the present modified example described above, if the buffer component 30 generates deformation that reaches the bumper beam 10, the setting part 30A of the pressure pipe 40 in the buffer component 30 enters the cut part 18, and therefore, interference between the pressure pipe 40 and the bumper beam 10 can be avoided to inhibit excessive deformation of the pressure pipe 40. Therefore, pressure changes can be suitably detected by using a pressure sensor 42.

In addition, if the cut part 18 is used as an interference avoiding unit, even in a case in which there is no space for layout on upper and lower sides of the bumper beam 10, interference between the pressure pipe 40 and the bumper beam 10 can also be avoided.

Further, the following structure may also be used, that is, the cut part 18 is formed by cutting a specified range that includes an upper end part of the front surface part 11, and the setting part 30A of the pressure pipe 40 in the buffer component 30 enters the cut part 18 on the upper side.

Secondly, a vehicle bumper 1 of a second modified example is described with reference to FIG. 6A, FIG. 6B, and FIG. 7. Further, same symbols are attached to elements the same as those in the implementation manner and repeated descriptions are omitted.

Figure 6A:
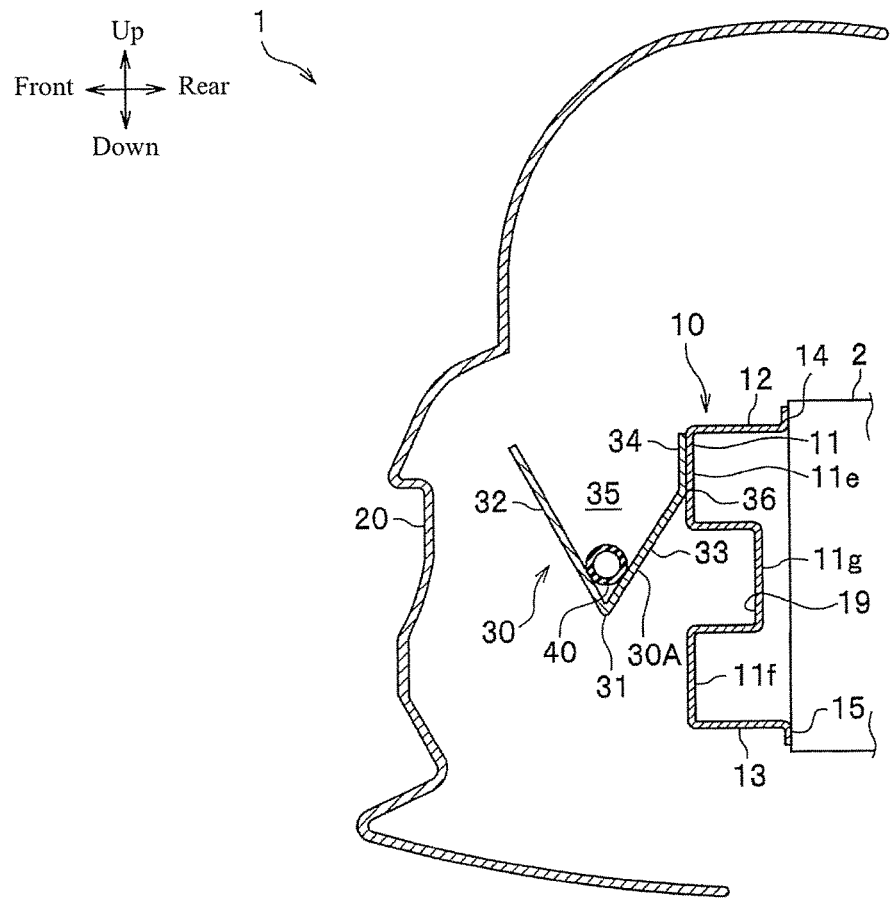
FIG. 6A is a cross-sectional view, which corresponds to FIG. 2A, of a vehicle bumper of a second modified example of the present invention.
Figure 6B:
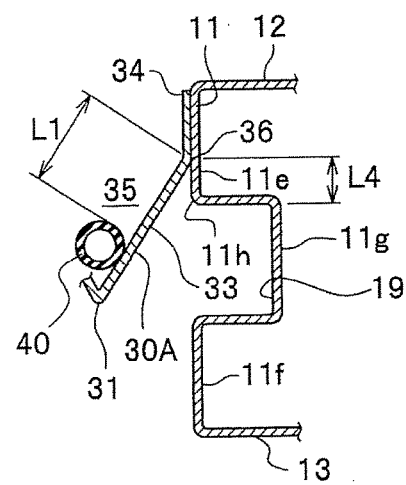
FIG. 6B is a local enlarged cross-sectional view of FIG. 6A.

As shown in FIG. 6A, a recess 19 that has a rectangular cross section and is formed by recessing a part (a middle part in the present modified example) of a front surface part 11 towards a rear side of a collision direction (a rear part of a vehicle in the present modified example) is provided in a bumper beam 10 of the second modified example. The recess 19 is provided on the front surface part 11 in a manner of extending along a vehicle width direction.

During collision, the recess 19 functions as a space part that avoids interference between the bumper beam 10 and a setting part 30A for a pressure pipe 40 in a buffer component 30. The front surface part 11 of the modified example includes two abutting surfaces 11e and 11f that are located on two separated locations in a vertical direction and a step surface 11g that has a U-shaped cross section and is located between the abutting surfaces 11e and 11f. The step surface 11g (the recess 19) is provided at a further rear location of the vehicle relative to the abutting surfaces 11e and 11f.

The pressure pipe 40 is disposed at a height location approximately the same as the recess 19 in state before collision. As shown in FIG. 6B, a distance L1 from a bent part 36 formed on an upper end part of a surface part 33 to an upper peripheral surface of the pressure pipe 40 is set to be greater than a distance L4 from the bent part 36 to a lower end part 11h of the abutting surface 11e located on an upper side (L1>L4). Therefore, as stated below, the setting part 30A of the pressure pipe 40 in the buffer component 30 can enter the recess 19 during collision.

Figure 7:
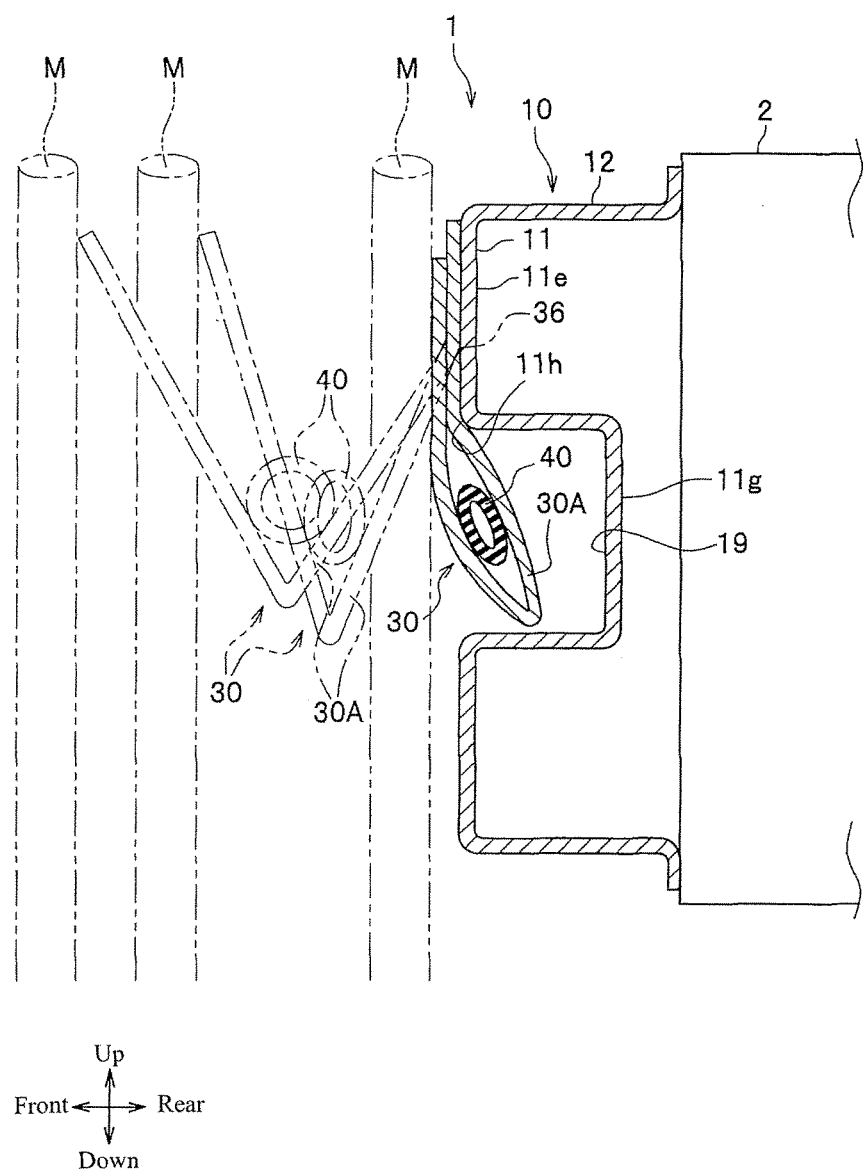
FIG. 7 is a cross-sectional view of a collision process of a vehicle bumper of the second modified example.

In a collision process of the vehicle bumper 1 shown in FIG. 7, according to the present modified example, because the pressure pipe 40 is disposed at a height location approximately the same as that of the recess 19, a lower part, which includes the setting part 30A of the pressure pipe 40, in the buffer component 30 abuts against the lower end part 11h of the abutting surface 11e, and is bent backwards by using the lower end part 11h as a base point. In this case, the setting part 30A of the pressure pipe 40 in the buffer component 30 is deformed in a manner of entering the recess 19, and the pressure pipe 40 enters the recess 19.

According to the present modified example described above, if the buffer component 30 generates deformation that reaches the bumper beam 10 the setting part 30A of the pressure pipe 40 in the buffer component 30 enters the recess 19, and therefore, interference between the pressure pipe 40 and the bumper beam 10 can be avoided to inhibit excessive deformation of the pressure pipe 40. Therefore, pressure changes can be suitably detected by using a pressure sensor 42.

In addition, rigidity of a cross section of the bumper beam 10 is improved due to the recess 19, and therefore the impact absorbing performance can be improved.

In the implementation manner and modified examples, the present invention is applied to a front bumper, and the present invention can also be applied to a rear bumper.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A vehicle bumper, configured to mitigate impact on a collided object when collision between the vehicle bumper and the collided object occurs, the vehicle bumper comprising:
   a bumper beam, extending along a vehicle width direction;
   a bumper face, covering a vehicle body front surface or a vehicle body rear surface that comprises the bumper beam; and
   a buffer component, provided between the bumper beam and the bumper face, wherein
   the bumper beam comprises a front surface part that becomes a collision surface, and at least one of an upper surface part connected to an upper end part of the front surface part and a lower surface part connected to a lower end part of the front surface part;
   the buffer component comprises a platelike component configured to be folded upon collision load;
   the buffer component comprises at least one folded part, and at least two surface parts that are connected through the folded part and are opposite to each other with a gap therebetween in a front-rear direction of the vehicle;
   a pressure pipe configured to be deformed by being clamped between the two surface parts so as to detect impact is provided in the gap; and
   a space part configured to avoid interference between the bumper beam and a setting part for the pressure pipe in the buffer component during collision is provided.

2. The vehicle bumper according to claim 1, wherein
an upper space part located at an upper location relative to the upper surface part or a lower space part located at a lower location relative to the lower surface part forms the space part; and
the pressure pipe is disposed with an offset in a height direction relative to the front surface part of the bumper beam.

3. The vehicle bumper according to claim 1, wherein
a cut part formed by cutting a part of the front surface part towards a rear side of a collision direction is provided in the bumper beam;
the cut part forms the space part; and
the pressure pipe is disposed at a height location the same as that of the cut part.

4. The vehicle bumper according to claim 1, wherein
a recess formed by recessing a part of the front surface part towards a rear side of a collision direction is provided in the bumper beam;
the recess forms the space part; and
the pressure pipe is disposed at a height location the same as that of the recess.

5. The vehicle bumper according to claim 2, wherein
a bent part that becomes a base point upon which the buffer component is bent is formed on an end part, located on a side opposite to the folded part, of the surface part located in a rear part of the vehicle, and
a distance from the bent part to a peripheral surface of the pressure pipe on a side of the bent part is set to be greater than a distance from the bent part to an end part of the front surface part on a side of the space part.

6. The vehicle bumper according to claim 3, wherein
a bent part that becomes a base point upon which the buffer component is bent is formed on an end part, located on a side opposite to the folded part, of the surface part located in a rear part of the vehicle, and
a distance from the bent part to a peripheral surface of the pressure pipe on a side of the bent part is set to be greater than a distance from the bent part to an end part of the front surface part on a side of the space part.

7. The vehicle bumper according to claim 4, wherein
a bent part that becomes a base point upon which the buffer component is bent is formed on an end part, located on a side opposite to the folded part, of the surface part located in a rear part of the vehicle, and
a distance from the bent part to a peripheral surface of the pressure pipe on a side of the bent part is set to be greater than a distance from the bent part to an end part of the front surface part on a side of the space part.

* * * * *